Nov. 3, 1925.
F. EDINGER ET AL
1,559,561
REEL FOR TAPE AND LIKE TEXTILES
Filed Aug. 27, 1923
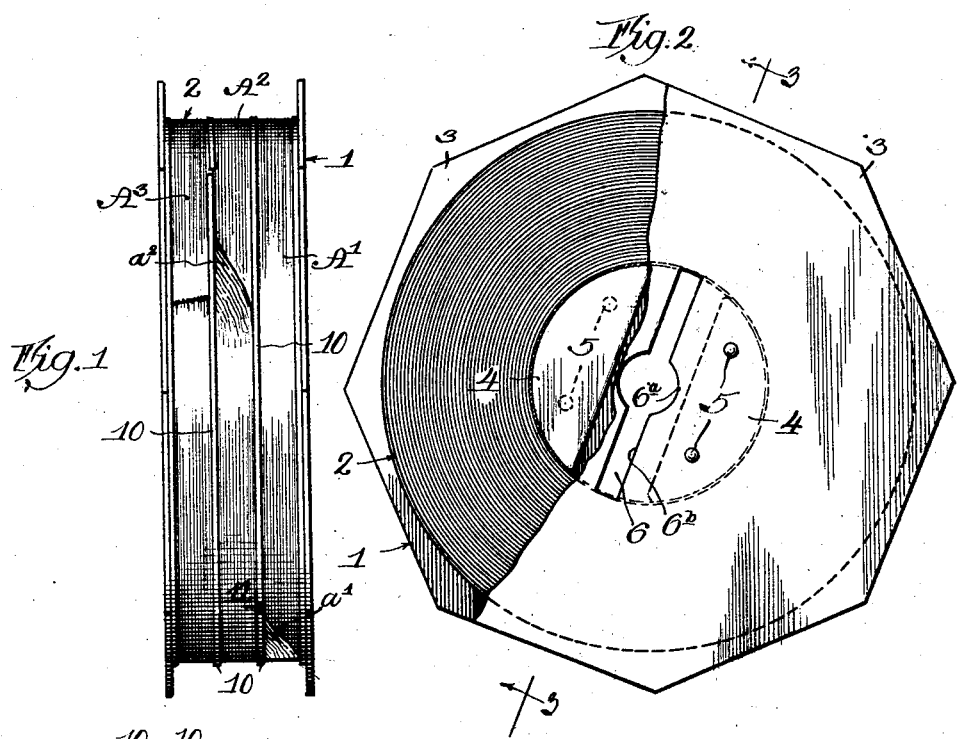
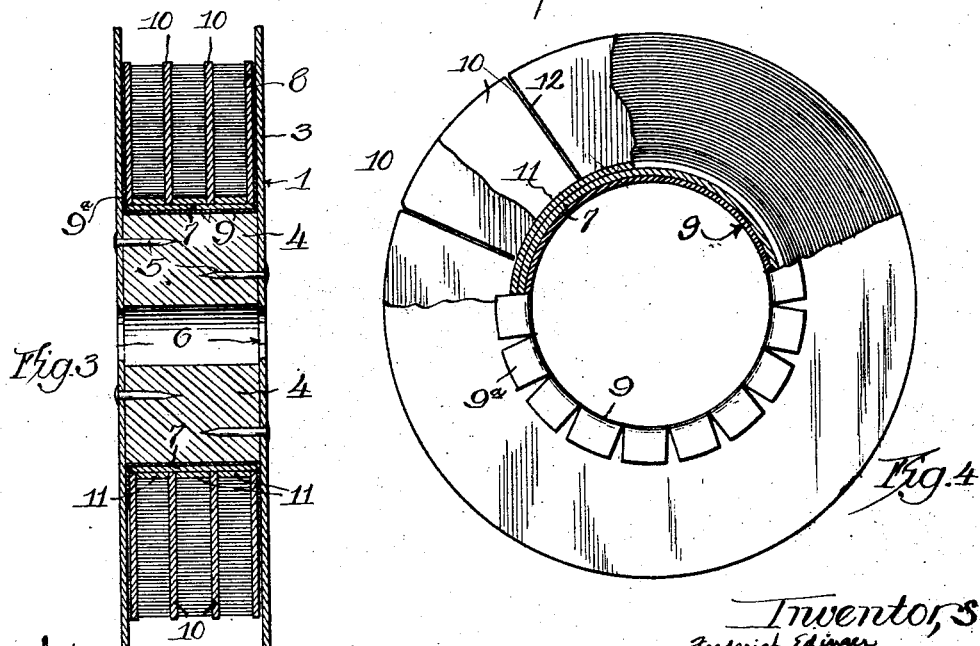

Patented Nov. 3, 1925.

1,559,561

UNITED STATES PATENT OFFICE.

FREDERICK EDINGER AND ALBERT J. GELOW, OF THREE OAKS, MICHIGAN, ASSIGNORS TO WARREN FEATHERBONE COMPANY, OF THREE OAKS, MICHIGAN, A CORPORATION OF MICHIGAN.

REEL FOR TAPE AND LIKE TEXTILES.

Application filed August 27, 1923. Serial No. 659,490.

*To all whom it may concern:*

Be it known that we, FREDERICK EDINGER and ALBERT J. GELOW, both citizens of the United States, and both residents of Three Oaks, in the county of Berrien and State of Michigan, have invented certain new and useful Improvements in Reels for Tape and like Textiles, of which the following is a specification.

This invention relates to improvements in reels, adapted to be used for and dispensing tape, ribbon, elastic, braid and like textiles.

A preferred method of retailing textiles of this character, involves the use of a display stand designed to rest on a counter, and having one or more horizontal arms on which are supported a number of reels, on which different grades and varieties of ribbon or the like are wound.

While the invention includes the complete reel, designed particularly for use with a display stand, the novel features pertain especially to the spool, on which the material is wound, and the provisions made for a new method of winding the material, the principal object in view, being to increase the capacity or yardage, without increasing the diameter of the spool. This is accomplished by winding a continuous length of material onto the spool in several sections, the spool being so constructed as to make this arrangement possible. A preferred embodiment of the invention is disclosed in the accompanying drawings, wherein:

Figure 1 is a view in front elevation of a single reel filled to capacity with a narrow material such as elastic tape.

Figure 2 is a view in side elevation of the reel, with a portion cut away to show the details of construction.

Figure 3 is a cross sectional view taken on line 3—3 of Figure 2, and

Figure 4 is a detail view in side elevation of the spool removed from the spool-holder, and with portions cut away to show its construction.

In describing the device, the term reel is used to define the complete unit, which consists of two main parts, the stationary spool holder 1 and the spool 2. The spool holder is adapted to be supported with its axis horizontal and held against rotation, a flanged rod which passes through an opening at its center, being suitable for this purpose. The spool is freely rotative on the core of the spool holder so that the tape can be dipsensed by unwinding the desired length.

The spool holder is designed to be of a light and strong construction, consisting of two side walls 3—3, preferably made of two pieces of stiff card-board, octagonal in shape, secured to a centrally located core consisting of two blocks 4, 4, extending axially between the walls, the latter being secured by nails 5—5 driven into the ends of the blocks. The blocks are generally semi-circular in shape, but spaced apart, not only to form a cylindric bearing for spool, but also a diametrically symmetric space between their inner faces. Secured at the centers of the walls 3—3, and symmetrical with the axis of the spool holder are openings or slots 6, 6, which register with the space between the blocks 4, 4. Each slot has an axially disposed circular portion 6$^a$ and oppositely disposed radial slot 6$^b$. The openings are preferably made in this shape to conform to the members on which the reels are mounted, the same being a rod having flanges engaging the slots 6$^b$ so as to keep the spool holder from turning on its axis.

The spool 2 is also made of card-board, and consists of a central core or drum 7, of a diameter to fit and rotate freely on the bearing formed by the blocks 4, 4 and apertured discs 8, 8, forming radial flanges at the ends of the core. These discs are fitted over the ends of the core 7, and secured by means of an adhesive lining 9, having a series of marginal flaps 9$^a$, which are glued around the adjacent edges of the discs 8, 8 (Figure 4). Intermediate the discs 8, 8 are two similar discs or annular partition walls 10—10 spaced equidistantly from the outer discs, and from each other, thus dividing the spool into three equal divisions or sections.

The intermediate discs 10, 10 are loosely mounted on the core, so that they may be rotated, but are held against axial movement on the core, by spacing collars 11, 11, 11 consisting of rings of card-board surrounding the core, at the base of each section.

At some point in each of the intermediate discs 10, 10, is cut a radial slot or slit 12, extending from the outer edge to a point near its inner edge. These slots need not be located at any particular place, since the discs can be turned so as to bring the slots into the desired positions.

Referring to Figure 1, the method of winding the material onto the spool will be described:

Assuming that the general direction of winding is from right to left, the tape or other material is first wound onto the right hand section of the spool, in the usual way until this section is filled with a bolt of tape $A^1$. When this section is filled, the tape is slightly twisted as at $a^1$, passed laterally and downwardly to the base of the next or intermediate section through the slot 12, in the adjacent partition wall or intermediate disc 10, said disc being turned so that the slot will be positioned to receive the twisted portion of the tape. The intermediate section is then filled as before with a bolt $A^2$, and the tape again twisted at $a^2$ and passed through the slot 12 in the second partition wall 10, as before, to the left-hand section, and this is filled with a bolt $A^3$.

In this manner, a continuous unsevered length of tape is wound onto a single spool, having a diameter no greater than that of a bolt having the same capacity as a single section of the spool. In other words, the sectional spool multiplies the capacity by the number of sections or divisions, without increasing the diameter of the spool. So also the particular method of winding permits the increased yardage, without cutting or splicing the portions carried on the different sections, hence the wastage is reduced, the spool lasts much longer, and the successive unwinding of the sections enables the sales-person to estimate at a glance the approximate stock on hand, and thus to make arrangements in ample time for a new supply.

This method of winding is materially facilitated by the intermediate partitions, which keep the material of each section in proper shape, during the unwinding of the successive sections, the end portion of each section being tightly held in the slots 12 of the partition members until the preceding section is emptied.

The type of reel herein disclosed provides a particularly light and strong construction for the purpose for which it is intended, and which can be made with a considerable saving in labor and materials.

Obviously, the number of sections into which a spool holder can be divided, can be varied, depending upon the width of the material to be carried, hence the particular arrangement herein disclosed does not indicate the limits to which the arrangement can be carried, nor are the specific details of construction necessary to the practical utilization of the invention.

We claim as our invention:

1. A reel for narrow textiles comprising a relatively stationary holder consisting of a cylindric body having end walls extending beyond the periphery thereof, and a core rotative on said body, and provided with radial partition walls spaced apart longitudinally of said core, and forming a plurality of spaces therebetween, and slits cut in the partition walls intermediate said spaces whereby a plurality of unsevered bolts may be wound on to said core.

2. A reel for narrow textiles, comprising a holder consisting of a cylindric body provided with end walls secured to the side faces thereof, and a spool rotatively mounted on said body and comprising a core surrounding said body, and provided with radially extending partition walls loosely mounted thereon, and each provided with a radial slit.

3. A reel for narrow textiles comprising a relatively stationary holder including a cylindric body, and a spool rotatively mounted on said holder comprising an annular core having radial end walls, and intermediate partition walls, the latter being loosely mounted on said core, and held in spaced relation by intermediate spacing collars surrounding said core.

4. A reel for narrow textiles comprising a holder consisting of a cylindric body having radially extending end walls, and a spool rotative on said body and comprising an annular core having radially extending end walls, and intermediate partition walls between said end walls, rotative on said core and engaging equidistantly spaced grooves formed in said core, each provided with a radial slit.

In witness whereof, we hereunto subscribe our names this 14th day of August, A. D. 1923.

FREDERICK EDINGER.
ALBERT J. GELOW.